(12) United States Patent
Kay et al.

(10) Patent No.: US 10,744,697 B2
(45) Date of Patent: Aug. 18, 2020

(54) APPARATUS FOR EXTRUDING PLASTIC MATERIALS

(71) Applicant: REDETEC INC., Toronto (CA)

(72) Inventors: Alex W. Kay, Vancouver (CA); James Dennon Oosterman, Toronto (CA); David Miles Joyce, Port Moody (CA)

(73) Assignee: REDETEC INC., Toronto (CA)

( * ) Notice: Subject to any disclaimer, the term of this patent is extended or adjusted under 35 U.S.C. 154(b) by 297 days.

(21) Appl. No.: 15/119,526

(22) PCT Filed: Feb. 18, 2015

(86) PCT No.: PCT/CA2015/000099
§ 371 (c)(1),
(2) Date: Aug. 17, 2016

(87) PCT Pub. No.: WO2015/123757
PCT Pub. Date: Aug. 27, 2015

(65) Prior Publication Data
US 2017/0008214 A1    Jan. 12, 2017

Related U.S. Application Data

(60) Provisional application No. 61/941,689, filed on Feb. 19, 2014.

(30) Foreign Application Priority Data

Feb. 20, 2014   (CA) .................................... 2843392

(51) Int. Cl.
*B29C 48/80*     (2019.01)
*B29C 48/92*     (2019.01)
(Continued)

(52) U.S. Cl.
CPC ............ *B29C 48/802* (2019.02); *B29B 7/421* (2013.01); *B29B 7/428* (2013.01); *B29C 48/05* (2019.02);
(Continued)

(58) Field of Classification Search
CPC . B29C 47/802; B29C 47/363; B29C 47/6043; B29C 47/6087; B29C 47/64; B29C 47/92
See application file for complete search history.

(56) References Cited

U.S. PATENT DOCUMENTS 2,895,167 A   7/1959 Paggi
2,896,253 A   7/1959 Mol
(Continued)

FOREIGN PATENT DOCUMENTS

DE   7013580 U    7/1970
DE   19637063 A1  3/1998
(Continued)

OTHER PUBLICATIONS

PCT international Search Report and Written Opinion dated May 25, 2015 re: International Application No. PCT/CA2015/000099.
(Continued)

*Primary Examiner* — Joseph S Del Sole
*Assistant Examiner* — Jamel M Nelson
(74) *Attorney, Agent, or Firm* — Norton Rose Fulbright Canada LLP

(57) ABSTRACT

Apparatus and methods for extruding plastic materials are disclosed. An exemplary apparatus comprises: a feeding portion; a melting portion in communication with the feeding portion and configured to transmit heat into material received from the feeding portion; and an output die in communication with the melting portion to permit extrusion of the material. The melting portion comprises: a melting barrel having an inner surface defining a melting chamber in
(Continued)

communication with the feeding portion; and a melting insert inside the melting chamber. The melting insert comprises an outer surface in contact with the inner surface of the melting barrel where the outer surface comprises one or more open-ended channels formed therein. In some embodiments, the feeding portion and the melting portion may be thermally insulated from each other and a propeller of the feeding portion may be disposed entirely outside of the melting portion.

4 Claims, 11 Drawing Sheets

(51) Int. Cl.

| | |
|---|---|
| *B29C 48/68* | (2019.01) |
| *B29C 48/625* | (2019.01) |
| *B29C 48/67* | (2019.01) |
| *B29C 48/275* | (2019.01) |
| *B29C 48/05* | (2019.01) |
| *B29C 48/54* | (2019.01) |
| *B29C 48/25* | (2019.01) |
| *B29C 48/36* | (2019.01) |
| *B29C 48/694* | (2019.01) |
| *B29B 7/42* | (2006.01) |
| *B29C 48/285* | (2019.01) |
| *B29C 48/02* | (2019.01) |
| *B29C 48/70* | (2019.01) |

(52) U.S. Cl.
CPC ...... *B29C 48/25684* (2019.02); *B29C 48/277* (2019.02); *B29C 48/362* (2019.02); *B29C 48/54* (2019.02); *B29C 48/625* (2019.02); *B29C 48/67* (2019.02); *B29C 48/68* (2019.02); *B29C 48/694* (2019.02); *B29C 48/832* (2019.02); *B29C 48/92* (2019.02); *B29C 48/02* (2019.02); *B29C 48/288* (2019.02); *B29C 48/705* (2019.02); *B29C 2948/92704* (2019.02); *B29C 2948/92876* (2019.02); *Y02P 70/263* (2015.11)

(56) References Cited

U.S. PATENT DOCUMENTS

| | | | |
|---|---|---|---|
| 3,253,302 | A | 5/1966 | Peters et al. |
| 3,284,848 | A | 11/1966 | Rice |
| 3,555,603 | A | 1/1971 | Haley |
| 3,701,512 | A | 10/1972 | Schippers et al. |
| 3,710,983 | A * | 1/1973 | Ricciardi ............ B01F 7/00408 |
| | | | 222/141 |
| 3,730,492 | A | 5/1973 | Maddock |
| 3,762,692 | A | 10/1973 | Schippers |
| 3,837,781 | A | 9/1974 | Lambertus |
| 3,897,937 | A | 8/1975 | Limbach |
| 3,989,434 | A | 11/1976 | Mercer |
| 4,170,446 | A | 10/1979 | Schutz et al. |
| 4,249,877 | A * | 2/1981 | Machen ................ B29C 48/865 |
| | | | 425/204 |
| 4,289,727 | A | 9/1981 | Herrington, Jr. |
| 4,388,262 | A | 6/1983 | Brasz et al. |
| 4,425,044 | A | 1/1984 | Kurtz et al. |
| 4,478,516 | A | 10/1984 | Kessler |
| 4,501,498 | A | 2/1985 | McKelvey |
| 5,063,016 | A | 11/1991 | Bauer et al. |
| 5,098,267 | A | 3/1992 | Cheng |
| 6,454,454 | B1 * | 9/2002 | Barr ...................... B29C 48/361 |
| | | | 366/78 |
| 7,032,843 | B1 * | 4/2006 | Johnson ................ B01F 5/0656 |
| | | | 239/488 |
| 7,468,152 | B2 | 12/2008 | Tunc |
| 2003/0128623 | A1 | 7/2003 | Leveque |
| 2004/0114461 | A1 | 6/2004 | Fuglister |

FOREIGN PATENT DOCUMENTS

| | | | | |
|---|---|---|---|---|
| GB | 977473 | | 12/1964 | |
| GB | 1314873 | | 4/1973 | |
| GB | 1314873 | A * | 4/1973 | ........... B29C 48/362 |
| JP | 9225942 | | 9/1997 | |

OTHER PUBLICATIONS

English translation of Japanese Publication No. JP9225942 dated Sep. 2, 1997 obtained from www1.orbit.com.
Dale Eldridge et al., Plastic Filament Extrusion System for Use with a 3D Printer, Jan. 9, 2012, Project 1158, ENPH 479, Engineering Physics, University of British Columbia, Canada.
Lyman, Fabrication and Operational Manual, Nov. 1, 2012.
Grozdanic, Lidija, 83-Year-Old Invention Designs Inexpensive Open-Source Filament Extruder to Cut the Cost of 3D Printing, Mar. 5, 2013, http://inhabitat.com/83-year-old-inventor-designs-inexpensive-open-source-filament-extruder-to-cut-the-cost-of-3d-printing/.
Cengel, Yungas A., et al., Fluid Mechanics: Fundamentals and Applications, Chapter 8: Flow in Pipes, https://www.uio.no/studier/emner/matnat/math/MEK4450/h11/undervisningsmateriale/modul-5/Pipeflow_intro.pdf, Chapter 8, Section 8-3, 2006.
Harold F. Giles, Jr., et al., Extrusion, The Definitive Processing Guide and Handbook, 2005, Section 1.5, pp. 5-7, Section 3.4, pp. 15-20; Section 4.1, pp. 35-39; Section 4.2, pp. 39-41.
Mark Dill, The fastest filament extrusion Bot, makes ABS/PLA in colour, https://www.kickstarter.com/projects/1622873957/the-fastest-filament-extrusion-bot-makes-abs-pla-i/posts?page=3, Jun. 30, 2013.
Extrusion of Thermoplastics, www.pitfallsinmolding.com/extrusion1.html, version dated Jul. 30, 2013.
European Patent Office, Communication dated Oct. 24, 2017 re: extended European search report re: Application No. 15752829.0.
English translation of Germany patent document No. DE 19637063 dated Mar. 19, 1998, https://www.google.ca/patents/DE19637063A1?dq=de19637063A1&cl=en, accessed on Nov. 14, 2017.
IP Australian Government; Examination Report No. 1 dated Feb. 17, 2017 re: Application No. 2015221368.
Canadian Intellectual Property Office, Office Action dated Feb. 28, 2019 re: Application No. 2,843,392.
European Patent Office, Communication pursuant to Article 94(3) EPC dated Feb. 1, 2019 re: Application No. 15 752 829.0.
English translation of Germany patent document No. DE 7013580U dated Jul. 16, 1970, accessed on Mar. 8, 2019.
Norton Rose Fulbright Canada LLP, Response dated Aug. 27, 2019 to Examiner's Requisition dated Feb. 28, 2019 re: Canadian Patent Application No. 2,843,392.
Norton Rose Fulbright Canada LLP, Response dated Mar. 11, 2020 to Examiners Requisition dated Sep. 11, 2019 re. Canadian Patent Application No. 2,843,392.
Canadian Intellectual Property Office, Examiner's Requisition dated Sep. 11, 2019 re. Canadian Patent Application No. 2,843,392.

* cited by examiner

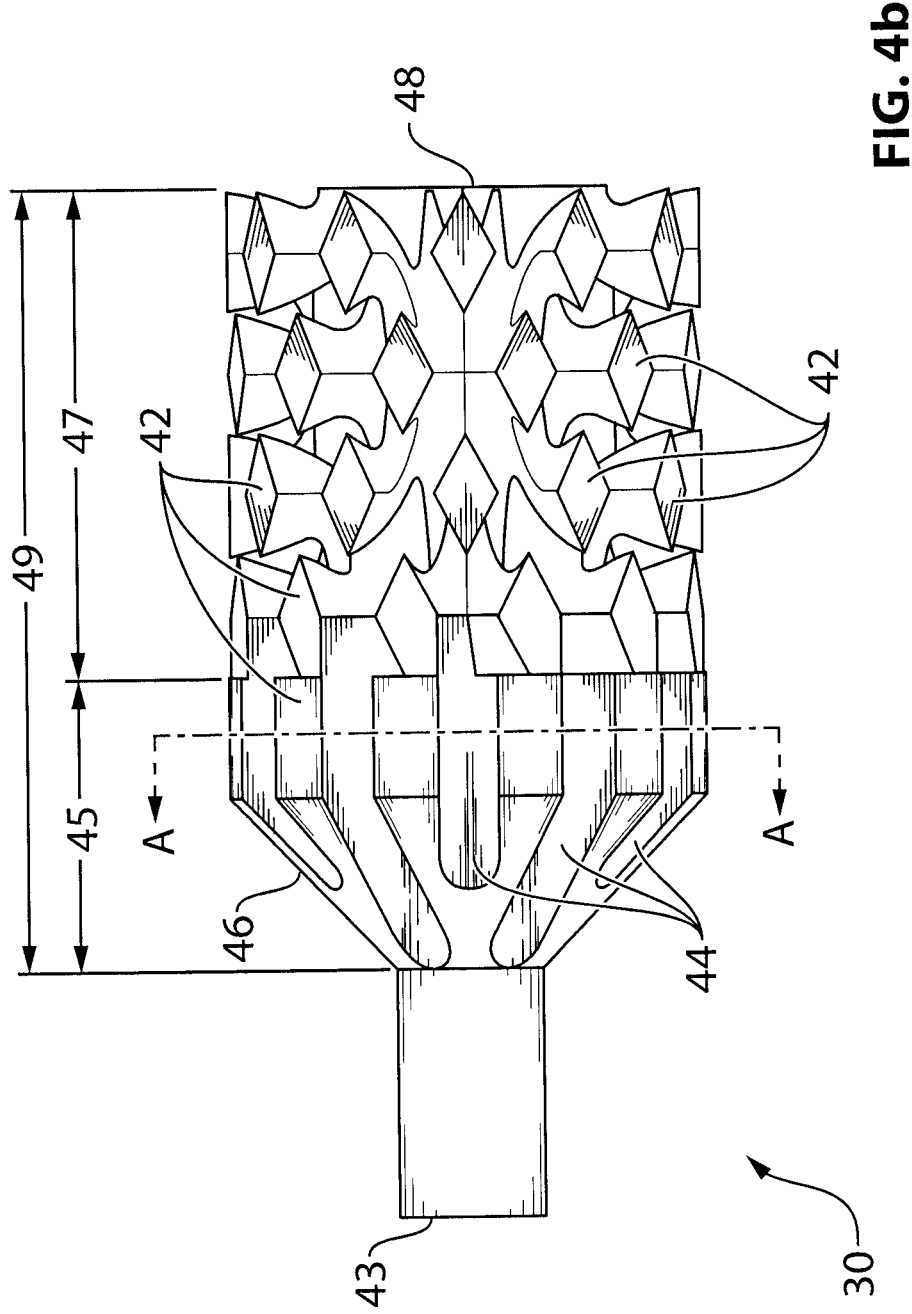

WITHOUT INSERT

WITH INSERT

APPARATUS FOR EXTRUDING PLASTIC MATERIALS

CROSS REFERENCE TO RELATED APPLICATIONS AND CLAIMS OF PRIORITY

This application is a national phase application under 35 U.S.C. 371 of International Patent Application No. PCT/CA2015/000099 filed on Feb. 18, 2015, which claims priority from U.S. provisional patent application No. 61/941,689 filed on Feb. 19, 2014 and to Canadian patent application no. 2,843,392 filed on Feb. 20, 2014, the entire contents of both of which are hereby incorporated by reference.

TECHNICAL FIELD

The disclosure relates generally to the extrusion of plastic materials, and more particularly to apparatus and methods for extruding plastic materials.

BACKGROUND OF THE ART

Plastic is becoming more and more popular for use in all fields for its easy handling, non-reactivity, and other properties. One popular form of plastic is extrudate, which may be used in 3D printing, plastic welding, and so on. Despite demand, processed plastic like rod, wire, or filament is still relatively expensive compared to the raw materials. For example, 3D printing filament (e.g. processed plastic material) ranges from $20-50 per kilogram compared to $1-5 per kilogram of raw plastic pellets. Additionally, manufacturing and processing of the plastic material is almost always done in industrial-scale factories or sites, and the processed product then needs to be transported to the vendors and/or consumers, as such, lots of time, energy, and money are often spent on transportation alone.

Many processes involving plastic material (e.g. 3D printing/prototyping, shipping/packaging and so on) can result in large quantities of waste materials which must be re-transported and processed for recycling. Often, the quantity and/or quality of recycled plastic material is not worth the energy of separation, cleaning, and processing required by mass recirculation. This is an issue for the typical consumer as well as placing plastic waste in a recycling bin can be an inconvenience for the average consumer. These un-recycled plastics can end up in our parks, landfills and oceans and cause environmental damage in the long-run.

While industrial-scale grinders and extruders both exist, industrial extruders tend to rely on a very powerful drive motor to turn a feed auger, which forces and compresses raw plastic material down the extruder barrel to achieve melting largely through polymer shear (i.e., friction) heating. This method of melting takes a lot of torque delivered to the auger to overcome the frictional and compressive forces and can require a very powerful motor. This can in turn incur high power consumption/losses. Heat is then mainly removed using cooling fans and/or fluid to control heat distribution along the extruder's length. This method of melting can also require a high length to diameter ratio to ensure consistent melting, thus requiring such devices to be relatively large.

Another issue with existing extruders is that the auger configuration requires stringent and complex temperature control along portions of the auger so that the plastic material does not begin to melt and stick in the feeding area, which could obstruct the flow of the material in the feeding portion. In addition, most extruders typically are in continuous operation because shutting it down can cause the plastic material in the form of viscous liquid to cool down and solidify around the auger and lead to operational issues relating to re-starting the extruder.

Improvement is therefore desirable.

SUMMARY

The disclosure describes devices, apparatus and methods for extruding materials including plastics such as thermoplastics.

In one aspect, the disclosure describes an apparatus for extruding plastic material. The apparatus comprises: a feeding portion; a melting portion in communication with the feeding portion and configured to transmit heat into material received from the feeding portion; and an output die in communication with the melting portion to permit extrusion of material received from the melting portion. The melting portion may comprise: a melting barrel having an inner surface defining a melting chamber in communication with the feeding portion; and a melting insert inside the melting chamber, the melting insert comprising an outer surface at least partially in contact with the inner surface of the melting barrel, the outer surface of the melting insert comprising one or more open-ended channels formed therein and extending in a flow direction of the melting barrel, the one or more channels and the inner surface of the melting barrel defining corresponding one or more through flow passages for delivering material toward the output die.

In another aspect, the disclosure describes an apparatus for extruding plastic material. The apparatus comprises: a feeding portion; a melting portion in communication with the feeding portion and configured to transmit heat into material received from the feeding portion; and an output die in communication with the melting portion to permit extrusion of material received from the melting portion. The melting portion may comprise: a melting barrel having an inner surface defining a melting chamber in communication with the feeding portion; and a melting insert inside of the melting chamber, the melting insert comprising an outer surface comprising a plurality of open-ended channels formed therein and extending in a flow direction of the melting barrel, the plurality of channels being separated by intermediate outer surface portions each cooperating with the inner surface of the melting barrel to provide a direct thermal conduction path between the melting barrel and the melting insert, the channels and the inner surface of the melting barrel defining corresponding through flow passages for delivering material toward the output die.

In another aspect, the disclosure describes an apparatus for extruding plastic material. The apparatus comprises: a feeding portion; a melting portion in communication with the feeding portion and configured to transmit heat into material received from the feeding portion; and an output die in communication with the melting portion to permit extrusion of material received from the melting portion. The feeding portion may comprise a propeller for feeding material toward the melting portion, the propeller being disposed entirely outside of the melting portion.

In a further aspect, the feeding portion and the melting portion may be at least partially thermally insulated from each other via a thermal insulator.

Further details of these and other aspects of the subject matter of this application will be apparent from the detailed description and drawings included below.

BRIEF DESCRIPTION OF THE DRAWINGS

Reference is now made to the accompanying drawings, in which:

FIG. 3b is a perspective view of the propeller of FIG. 3a;

FIG. 4b is a side view of another exemplary melting insert of the apparatus of FIG. 1;

FIG. 6b is a cross-sectional view of the apparatus in FIG. 6a, taken along line B-B in FIG. 6a;

FIG. 6c is a side view of some components of the apparatus in FIG. 6a; and

DETAILED DESCRIPTION

Aspects of various embodiments are described through reference to the drawings.

The disclosure relates generally to devices, apparatus and methods for extruding materials including plastics such as thermoplastics. In various embodiments, devices, apparatus and methods disclosed herein may reduce or eliminate the need for complex controls and mechanics, which can result in lower overall costs, more energy efficient, and ease of control and operation in relation to existing extrusion systems. The devices, apparatus and methods described herein can be used in conjunction with a plastic grinder or reducer to repurpose any suitable plastic material (e.g., thermoplastics) into extrudate. In various embodiments, devices, apparatus and methods described may be used to extrude filament suitable for existing 3D printing devices and therefore may allow the sourcing of printing "ink" from any raw or waste (e.g., recycled) plastics. Examples of materials suitable for use with the devices, apparatus and methods disclosed herein may include polylactide (PLA), acrylonitrile butadiene styrene (ABS), Polyethylene terephthalate (PET) and Nylon plastics.

In various embodiments, devices, apparatus and methods disclosed herein may allow the typical consumer to: a) easily produce their own plastic extrusions at home, using any suitable source of material they desire; and b) recycle plastics at home on a small scale, turning waste plastics back into usable materials with minimal energy, transportation, and industrial processes required. This can help reduce the overall energy footprint in recycling and processing of plastics, and can increase the amount of plastics that can be recycled, as the recycling can be done on a much smaller scale with minimal to moderate energy consumption. However, the teachings of the present disclosure are not limited to home-scale extrusion processes but may also be apply to industrial (e.g., plastic) extrusion processes.

Figure 1:
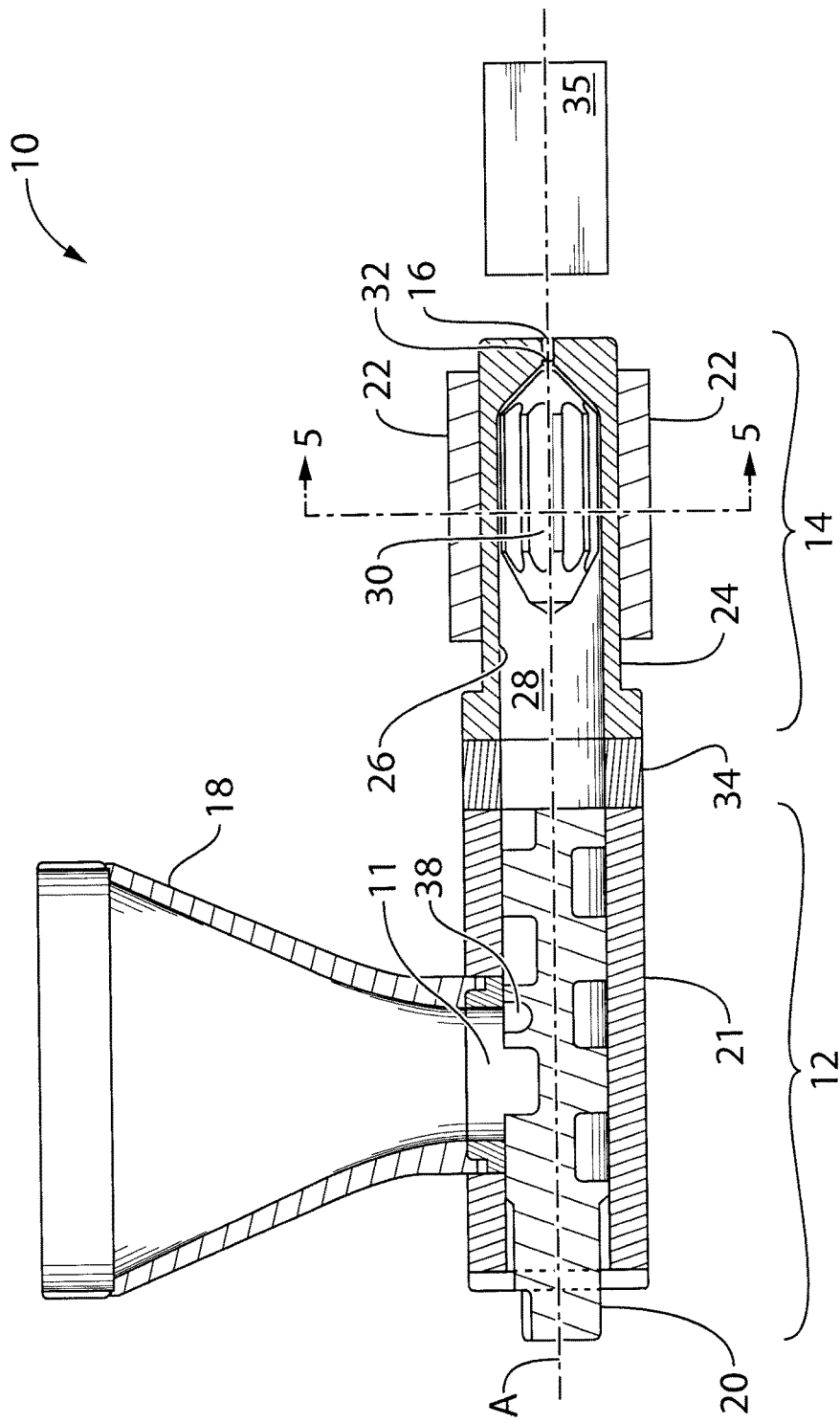
FIG. 1 is a cross-sectional view of an exemplary apparatus for extruding suitable plastic material.

FIG. 1 is an axial cross-sectional view of an exemplary apparatus 10 for extruding suitable plastic material(s). Apparatus 10 may comprise feeding portion 12, melting portion 14 and output die 16. Feeding portion 12 may comprise hopper 18 into which material(s) to be extruded may be received via feed opening 11. As explained below, the material to be extruded may be in particle (e.g., pellet) form of suitable size and shape. Feeding portion 12 may also comprise propeller 20 which may serve to propel the material from hopper 18 toward melting portion 14. Propeller 20 may, for example, comprise an auger configured to rotate substantially about axis A and to direct the material substantially along a flow direction, which may be substantially parallel to axis A. Propeller 20 may be disposed inside feeding barrel 21. Propeller 20 may extend only in feeding portion 12. For example, propeller 21 may be disposed entirely outside of melting portion 14 so that no part of propeller 20 (e.g., auger) may extend in melting portion 14.

Melting portion 14 may be in communication with feeding portion 12 so that melting portion 14 may receive the material from feeding portion 12. Melting portion 14 may also be configured to transmit heat into the material received into melting chamber 28 from feeding portion 12. Melting portion 14 may comprise one or more heating sources connected to or otherwise coupled to melting barrel 24 in order to heat the material inside melting chamber 28. Heat may be transmitted via a suitable heating means such as heater 22. Heater 22 may comprise any suitable heating device for injecting heat into melting portion 14. For example, heater 22 may comprise one or more types of heater elements suitable for the purpose of extrusion, such as electrical heaters, nozzle heaters, band heaters, cartridge heaters and so on. In various embodiments, heater 22 may comprise a suitable heater band that is typically used in existing extrusion devices.

Melting portion 14 may comprise melting barrel 24 having inner surface 26 defining melting chamber 28. Melting chamber 28 may be in communication with feeding portion 12 in order to receive the material delivered by propeller 20. Melting chamber 28 may have a portion of which that may, but not necessarily, have a substantially circular cross-section. For example, melting chamber 28 may have a substantially cylindrical portion that substantially extends along axis A. Melting portion 14 may also comprise one or more melting inserts 30, which may, as explained further below, assist in melting the material to be extruded flowing inside melting chamber and toward output die 16.

Output die 16 may be in communication with melting portion 14 to permit extrusion of the material received from melting portion 14. Output die 16 may have any suitable cross-sectional shape defining the cross-section of the extrudate produced. In various embodiments, the cross-sectional shape of output die 16 may be substantially circular or have another cross-sectional shape suitable for extruding filament for known or other 3D printing machines. Alternatively, output die 16 may have any suitable cross-sectional shape and area to produce, for example, thread, film, plastic welding rod or other type(s) of extrudate suitable for applications other than 3D printing. Screen 32 (e.g., breaker plate) may be disposed upstream of output die 16 and downstream of melting insert 30.

Thermal insulator 34 may be disposed between feeding portion 12 and melting portion 14. Thermal insulator 34 may hinder heat transfer from melting portion 14 to feeding portion 12. In various embodiments, thermal insulator 34 may at least partially prevent direct conductive heat transfer between melting barrel 24 and feeding barrel 21. For example, while melting barrel 24 and feeding barrel 21 may comprise metallic material(s), thermal insulator 34 may comprise one or more materials (i.e., silica, ceramic, metal oxide(s) and glass) having a lower thermal conductivity coefficient than melting barrel 24 and feeding barrel 21. For example, thermal insulator 34 may comprise a suitable ceramic spacer disposed between melting barrel 24 and feeding barrel 21. In various embodiments, the use of thermal insulator 34 may assist in preventing a temperature inside of feeding portion 12 to exceed a melting temperature of the material to be extruded. Accordingly, none or no significant melting of the material may occur in feeding portion 21. This may facilitate the re-starting of propeller 20 when apparatus 10 is being restarted since substantially no material has been melted and solidified on or around propeller 20 during shut-down. This may also reduce the torque requirement for turning propeller 20 during starting and also during continuous operation of apparatus 10 since propeller 20 does not have to cause melting of the material by mixing or shearing the material.

One or more pullers 35 may be disposed downstream of output die 16 for the purpose of pulling the extrudate out of output die 16 and thereby control the dimensional accuracy of the extrudate by, for example, reducing the die swell associated with the extrudate and/or reducing the diameter of the extrudate to within the desired range.

Figure 2:
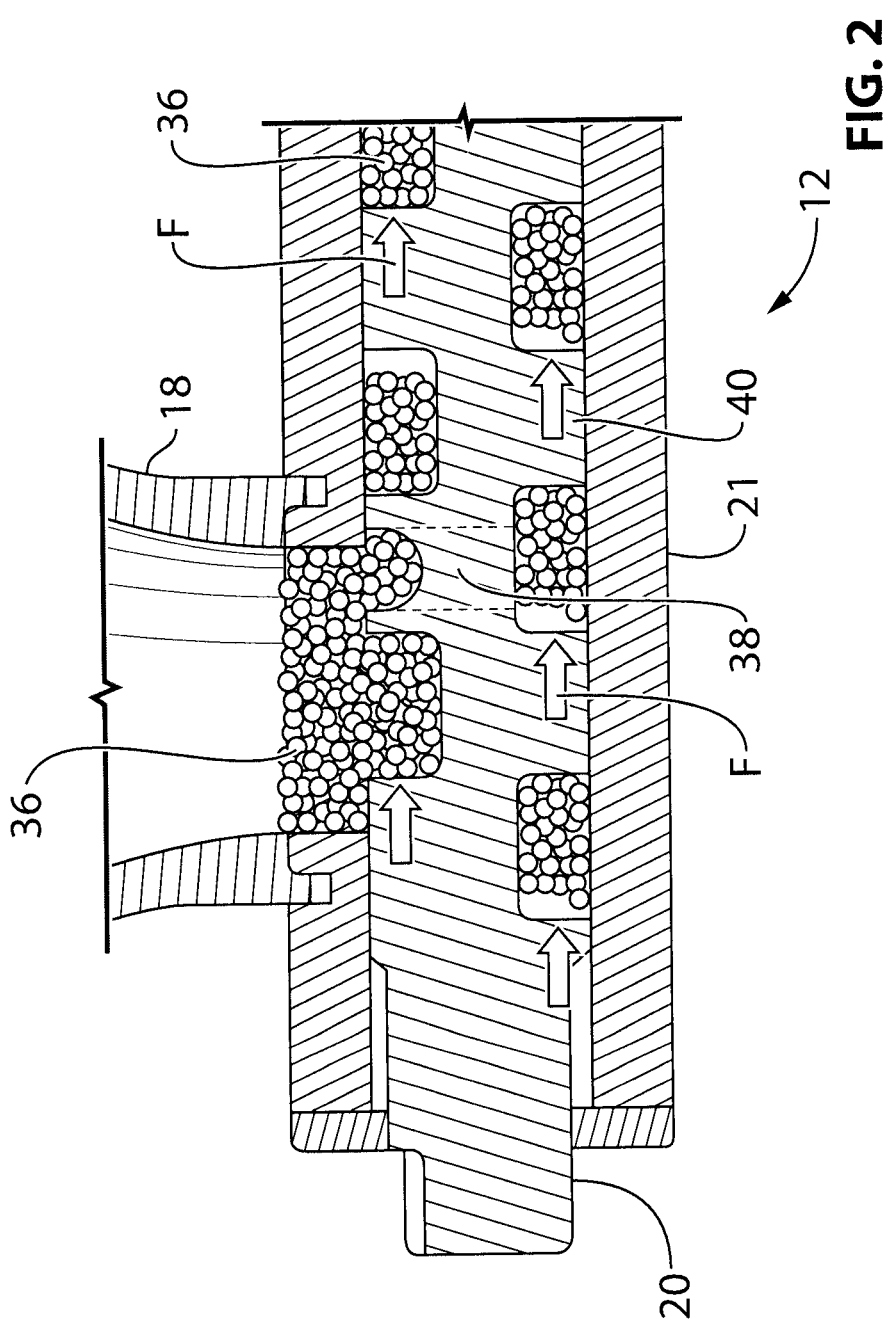
FIG. 2 is a cross-sectional view of a feeding portion of the apparatus of FIG. 1.

FIG. 2 is an axial cross-sectional view of feeding portion 12 of apparatus 10. FIG. 2 also shows plastic material 36 being fed from hopper 18 toward melting portion 14 along flow direction F by propeller 20. Plastic material 36 may be in particulate form when it is fed from hopper 18. With any auger conveying system, pellets or pieces of material can easily be caught between the auger flute and feed area wall. As the auger rotates to the point where the flute closes in on the wall, pieces can be pinched and/or cut if in the right position. This can cause inconsistent feed flow and driving torque/speed, and wear on the auger and feed area wall. Propeller 20 (e.g., auger) may comprise one or more notches 38 formed into one or more flutes 40 of propeller 20. Notch 38 may comprise a circumferential groove formed into propeller 20 near the feed area of hopper 18. Notch 38 may substantially prevent plastic material 36 from getting pinched between propeller 20 and feeding barrel 21 during feeding of the plastic material 36. This may also contribute to the reduced torque requirement for turning propeller 20 during feeding of the plastic material 36. Notch 38 may be larger than largest particle size expected to be fed into apparatus 10. Hence, particles (pellets) that end up in a position where they would normally be sheared between propeller 20 and feeding barrel 21 instead fall into notch 38 and either slide into feeding barrel 21 or are pushed back out of the way. Notch 38 may take away some of the pushing action provided by propeller 20 but the cross-sectional diameter of feeding barrel 21 may be made large enough so that the particles in notch 38 may still get pushed forward by the particles interacting with the flute(s) 40 of propeller 20 behind notch 38.

Figure 3A:
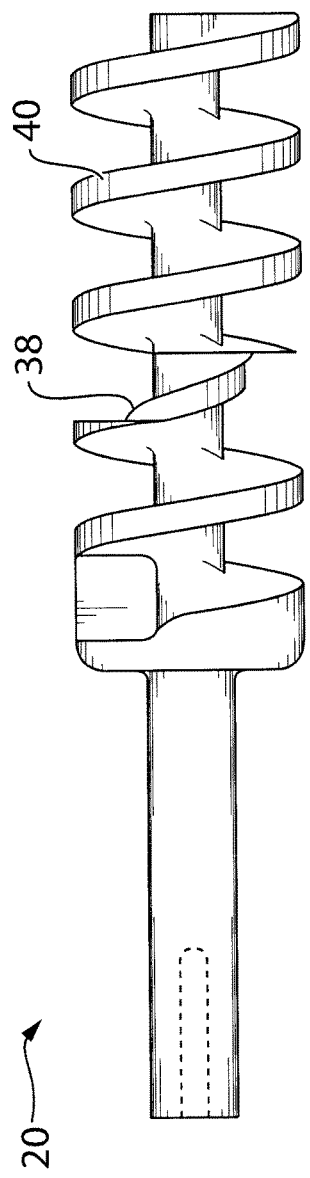
FIG. 3a is a side view of an exemplary propeller suitable for use with the apparatus of FIG. 1.
Figure 3B:
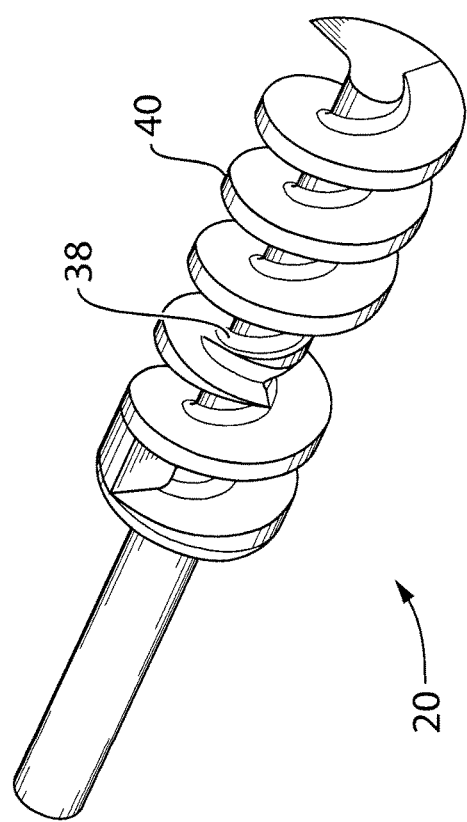

FIG. 3a is a side view of an exemplary propeller 20 of apparatus 10, and FIG. 3b is a perspective view of the exemplary propeller 20 of apparatus 10. As can been seen, propeller 20 (e.g., auger) may comprise one or more notches 38 formed into one or more flutes 40 of propeller 20. In some embodiments, propeller 20 (e.g., auger) may have a relatively high thread pitch with relatively thin flights as necessary to facilitate suitable propelling of plastic material 36. Propeller 20 may be disposed inside feeding barrel 21 for propelling plastic material 36 forward and toward melting chamber 28.

Figure 4A:
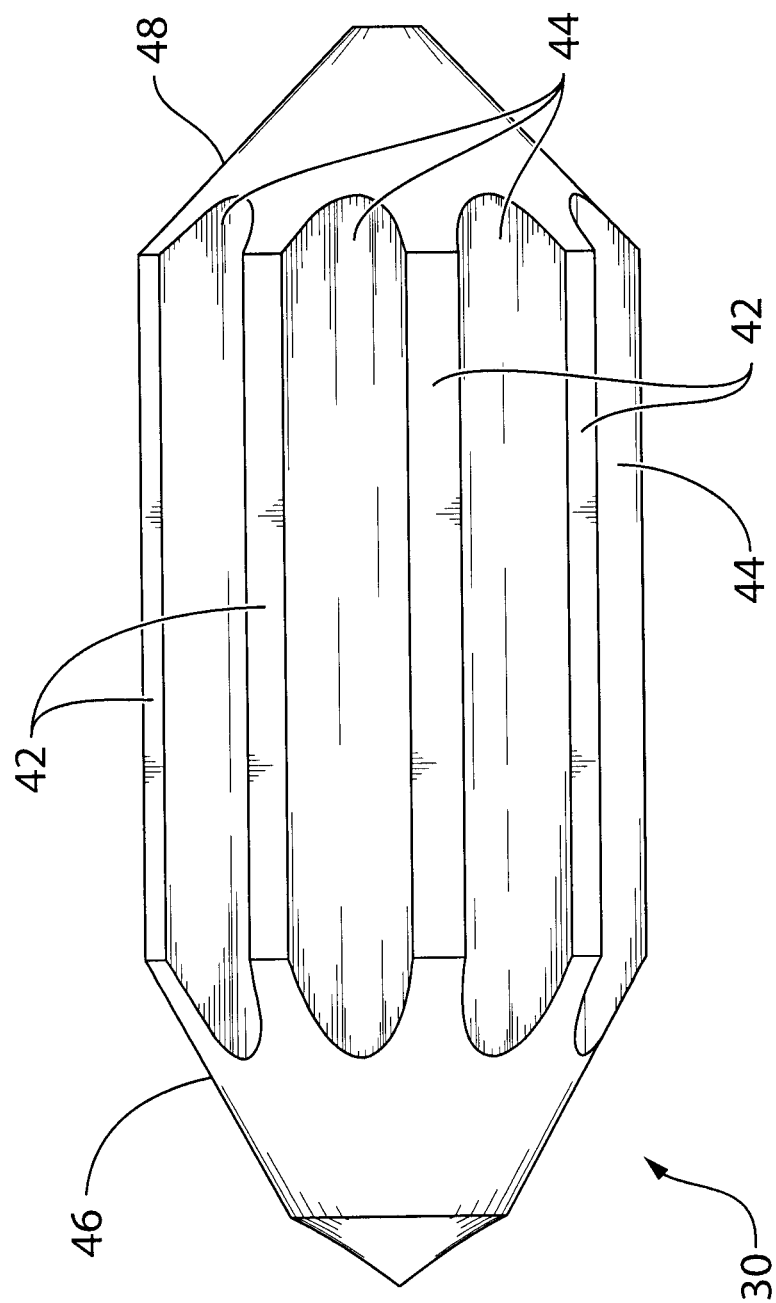
FIG. 4a is a side view of an exemplary melting insert of the apparatus of FIG. 1.

FIG. 4a is a side view of melting insert 30 of apparatus 10. Melting insert 30 may be configured for insertion into melting chamber 28 of melting portion 14. Melting insert 30 may comprise outer surface 42 configured to at least partially make contact with inner surface 26 of melting barrel 24. For example, outer surface 42 may be dimensioned and shaped to be in contact with inner surface 26 of melting barrel 24. In various embodiments where melting chamber 28 may have a substantially circular cross-section and an outer diameter of insert 30 may be substantially the same as the cross-sectional diameter of melting barrel 24. Outer surface 42 of melting insert 30 may comprise one or more open-ended channels 44 formed therein and extending at least to some extent in a flow direction (e.g., along axis A) of melting barrel 24. The one or more channels 44 and inner surface 26 of melting barrel 24 may define corresponding one or more through flow passages for delivering material 36 toward output die 16.

The at least partial contact between inner surface 26 (see FIG. 1) of melting barrel 24 and outer surface 42 of melting insert 30 may permit heat to be transferred conductively from melting barrel 24 into melting insert 30. In other word, direct contact between inner surface 26 of melting barrel 24 and outer surface 42 of melting insert 30 may provide a direct conductive heat transfer path between melting barrel 24 and insert 30. Plastic materials (otherwise referred herein as "plastic") typically have very low thermal conductivity, making it difficult to melt such materials. Heating time must be relatively long in proportion to the cross-section of the plastic volume being heated to allow acceptable heat distribution. In melting a flow of plastic in an extrusion system, the heating time generally translates to the length (in the flow direction) along which heat is input (e.g. heated auger or barrel). The length required may also depend on other factors such as the flow rate of the plastic and also the rate at which heat is added to the plastic. In any case, the extrusion barrel/auger must be long enough compared to the cross-sectional diameter from the center to the periphery of the flow, in order to ensure proper melting (e.g., length/diameter or L/D ratio>=20). In the simple case of pushing plastic through a heated tube or barrel, flow speed and rates can be limited by the L/D ratio. Higher L/D may allow for more heat to be added along the length of the barrel but flow resistance due to the increased length of tube or barrel can lower output pressure and flow rate for a given drive speed, force and diameter. Accordingly, melting insert 30 may, in some embodiments, contribute to a reduced torque requirement for propeller 20 due to reduced resistance to flow of material for a given L/D ratio and flow rate. For example, melting insert 30 may comprise a plurality open-ended channels 44 of relatively small cross-sectional diameters (i.e., compared to the cross-sectional diameter of melting chamber 28) in parallel to each other. Accordingly, incoming semi-viscous plastic flow may be directed into smaller, narrow flow(s). The plurality of open-ended channels 44 may be circumferentially-distributed around melting insert 30. In various embodiments, each of channels 44 may provide a L/D ratio equal to or greater than 20. In some embodiments, apparatus 10 may have an overall L/D ratio (i.e., for feeding portion 12 and melting portion 14) of about six. For example, an L/D ratio of only melting portion 14 may be about three in some embodiments.

Melting insert 30 may comprise one or more metallic materials or other suitable materials having a relatively good thermal conductivity. For example, melting insert 30 may be made from the same material as that of melting barrel 24. In various embodiments, melting insert 30 may have a substantially solid interior/core so that melting insert 30 may have substantial heat capacity.

Accordingly, as heat is conducted into melting insert 30 from melting barrel 24, heat may be conducted into material 36 in channels 44 from melting insert 30 and also from melting barrel 24 during steady state operation. For example, heat may be transferred to material 36 in channels 44 in substantially all directions that are perpendicular to channels 44 (e.g., and also perpendicular to axis A shown in FIG. 1). In other words, all bounding surfaces of channels 44 may serve as heating surfaces for the plastic material 36 flowing through channels 44. Material 36 may flow in channels 44 for at least some length or the entire length of melting portion 14 and may then be recombined and mixed before exiting through output die 16. The use of a plurality of channels 44 in parallel may reduce the thermal gradients within material 36 flowing through melting portion 24 and improve the heating efficiency.

In various embodiments, channels 44 may be substantially straight, have a uniform cross section and be aligned with axis A so that they may be parallel to each other. However, channels 44 may have other constructions than those shown herein. For example, channels 44 may have varying cross-section(s) along their lengths and may extend in a helical or other manner along melting insert 30. Channels 44 may be open-ended so that a first end receive material 36 from melting chamber 28 and a second end may deliver material 36 to output die 16.

In various embodiments, melting insert 30 may have leading end 46 and trailing end 48, where one or both of which may be tapered. The shape(s) of leading end 46 and trailing end 48 may be determined by the shape of melting chamber 28. The tapered shape of leading end 46 may assist in directing material 36 toward channels 44. Leading end 46 of melting insert 30 may also be tapered toward an optional central rod 43 (see e.g. FIGS. 4b and 4c) disposed inside of melting chamber 28. For example, such central rod may be disposed upstream of melting insert 30 in order to form an annular channel inside of melting chamber 28 and into which the plastic material 36 may flow before reaching melting insert 30. Such annular channel may also promote heating and melting of plastic material 36 by having plastic material 36 flow closer to inner surface 26 of melting barrel 24.

FIG. 4b is a side view of another exemplary melting insert 30 that may be suitable for use with apparatus 10. As illustrated, the melting insert 30 may include a central rod 43, a first portion 45 and a second portion 47. The first portion 45 of the melting insert 30 may comprise a leading end 46 that is tapered towards the central rod 43, so that plastic material 36 may flow past the central rod 43 and be directed to channels 44. Trailing end 48 may be square (i.e., not be tapered). The first portion 45 and the second portion 47 together may form the entire length 49 of channels 44. Each of the channels 44 may have a relatively straight path in the first portion 45, and then a helical path in the second portion 47 of the melting insert 30. Channels 44 may have constant or varying cross-section(s) along the length of second portion 47, and may extend in a helical or other manner along melting insert 30. For example, one or more of channels 44 (or part(s) thereof) may extend along a direction that is substantially parallel or non-parallel to longitudinal axis A (see FIG. 1). In some embodiment, channels 44 may intersect each other in a criss-cross manner (e.g., X-pattern). In some embodiments, channels 44 may be configured as (e.g., double) helixes. For example, channels 44 may intersect and combine with each other. For example, one or more of channels 44 may split into two or more channels 44.

Figure 4C:
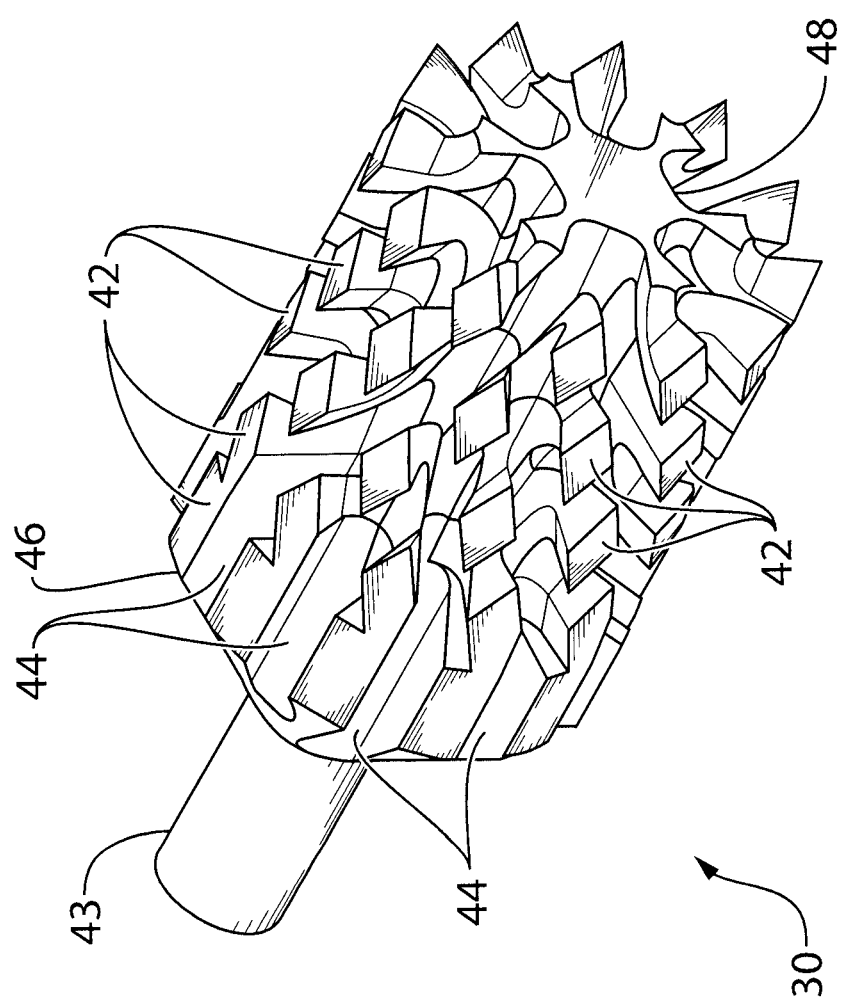
FIG. 4c is a perspective view of the melting insert of FIG. 4b.

FIG. 4c is a perspective view of the melting insert 30 of FIG. 4b. Inside each channel 44, plastic material 36 may be heated so that material 36 may be melted and turn into a viscous liquid due at least in part to the heating and friction provided by melting insert 30. One or more of the channels 44 may intersect or criss-cross one another, promoting mixing and enabling more uniform melting of plastic material 36. In addition, viscous friction associated with the flow of material 36 through the helical channels 44 may generate heat and vary the flow velocity profile, further promoting mixing and uniform melting. The helical configuration of the channels 44 may provide an even greater local L/D ratio (e.g., equal to or greater than about 20) for improved frictional heating and mixing, without requiring a large overall length 49 of the melting insert 30.

Figure 4D:
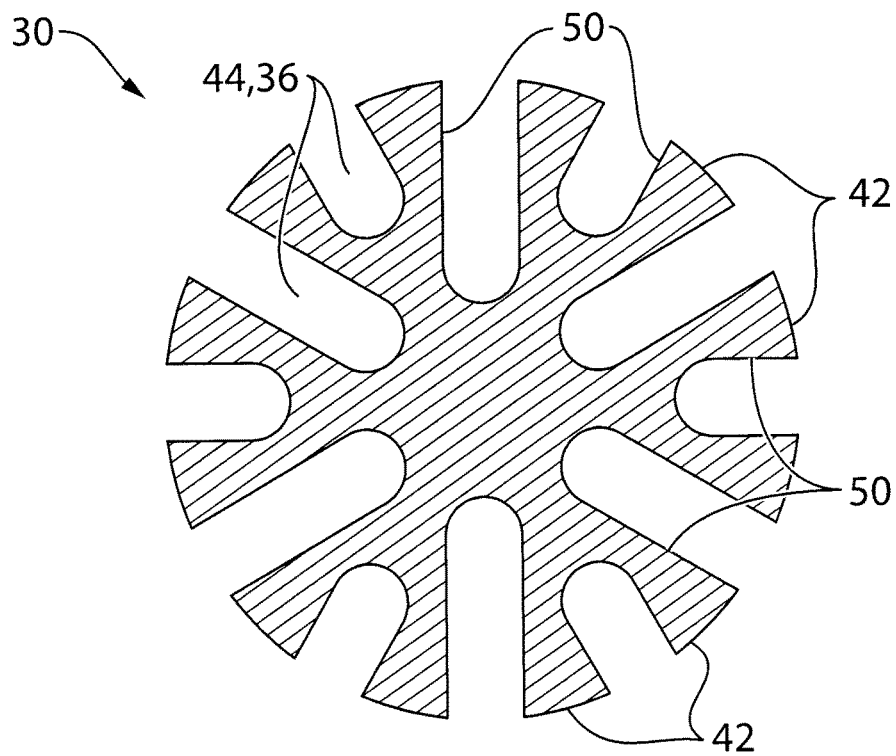
FIG. 4d is a transverse cross-sectional view of the melting insert of FIG. 4b, taken along line A-A in FIG. 4b.

FIG. 4d is a transverse cross-sectional view of the melting insert 30 of FIG. 4b along line A-A. Channels 44 may have uniform or different cross-sectional shape(s). As illustrated, each channel 44 may be defined by lower surface 50 having a substantially arcuate or "U" shaped cross-sectional profile. In some embodiment, lower surface 50 may extend inwardly towards the center of the melting insert 30. In various embodiments, alternate channels 44 may have a greater radial depth toward the center of melting insert 30 compared to adjacent channels 44.

Figure 5A:
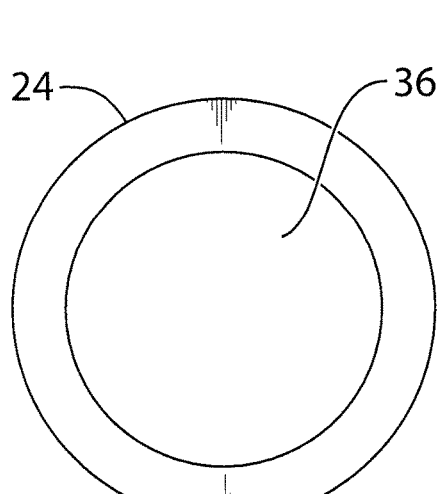
FIG. 5a is a transverse cross-sectional view of a melting chamber of an apparatus for extruding plastic material without a melting insert.
Figure 5B:
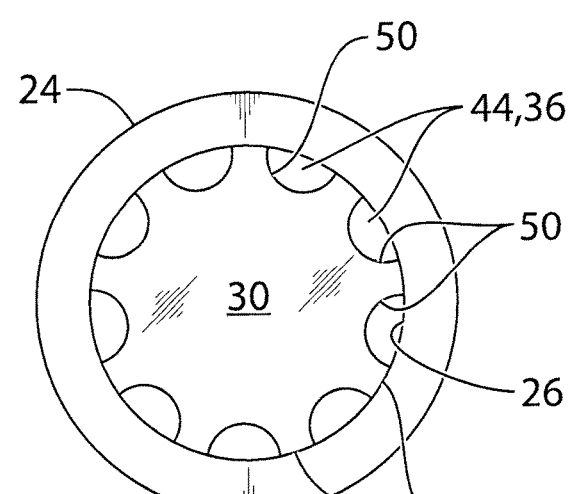
FIG. 5b is a transverse cross-sectional view of a melting chamber of the apparatus of FIG. 1 with the melting insert of FIG. 4a, taken along line 5-5 in FIG. 1.

FIG. 5a is a cross-sectional view of a melting chamber of an apparatus for extruding plastic material without a melting insert and FIG. 5b is an analogous cross-section view of melting chamber 28 of apparatus 10 with melting insert 30, taken along line 5-5 in FIG. 1. By way of melting channels 44, plastic material 36 is divided into multiple, parallel heated flows, shown in FIG. 5b. The L/D ratio of each channel 44 is higher than the single, larger flow of the melting chamber shown in FIG. 5a without melting insert 30. The length, shape, and diameter of the melting insert 30 as well as the number, size, shape, etc. of channels 44 are parameters of operation and may be different than those shown depending on the specific application and process parameters. Melting insert 30 may split the flow of material 36 into several flows in parallel allowing for an increased L/D ratio, with a considerably small overall length of melting portion 14 (and consequently of apparatus 10) in comparison with a single channel of comparable cross-sectional area and L/D ratio. The overall flow volume inside melting chamber 28 may be decreased due to the presence of melting insert 30 but the thermal gradients across material 36 in channels 44 may also be decreased in comparison with the melting chamber shown in FIG. 5a. Accordingly, at steady state, the use of melting insert 30 may, in some embodiments, result in faster melting of material 36 while requiring comparable or less energy input than would otherwise be required without the use of melting insert 30.

As shown in FIG. 5b, inner surface 26 which defines melting chamber 28 may have a substantially circular cross-sectional profile. Accordingly, outer surface 42 may correspondingly follow the same profile so that one or more of the intermediate surface portions 42 defined between the circumferentially-distributed channels 44 may be in contact with inner surface 26 when insert 30 is disposed inside melting chamber 28. Channels 44 may comprise open-ended grooves formed in outer surface 42 of insert. One or more of channels 44 may have a partially circular, square or other suitable cross-sectional shape. As shown in FIG. 5b, each channel 44 may be defined by lower surface 50 having a substantially arcuate cross-sectional profile.

Figure 6A:
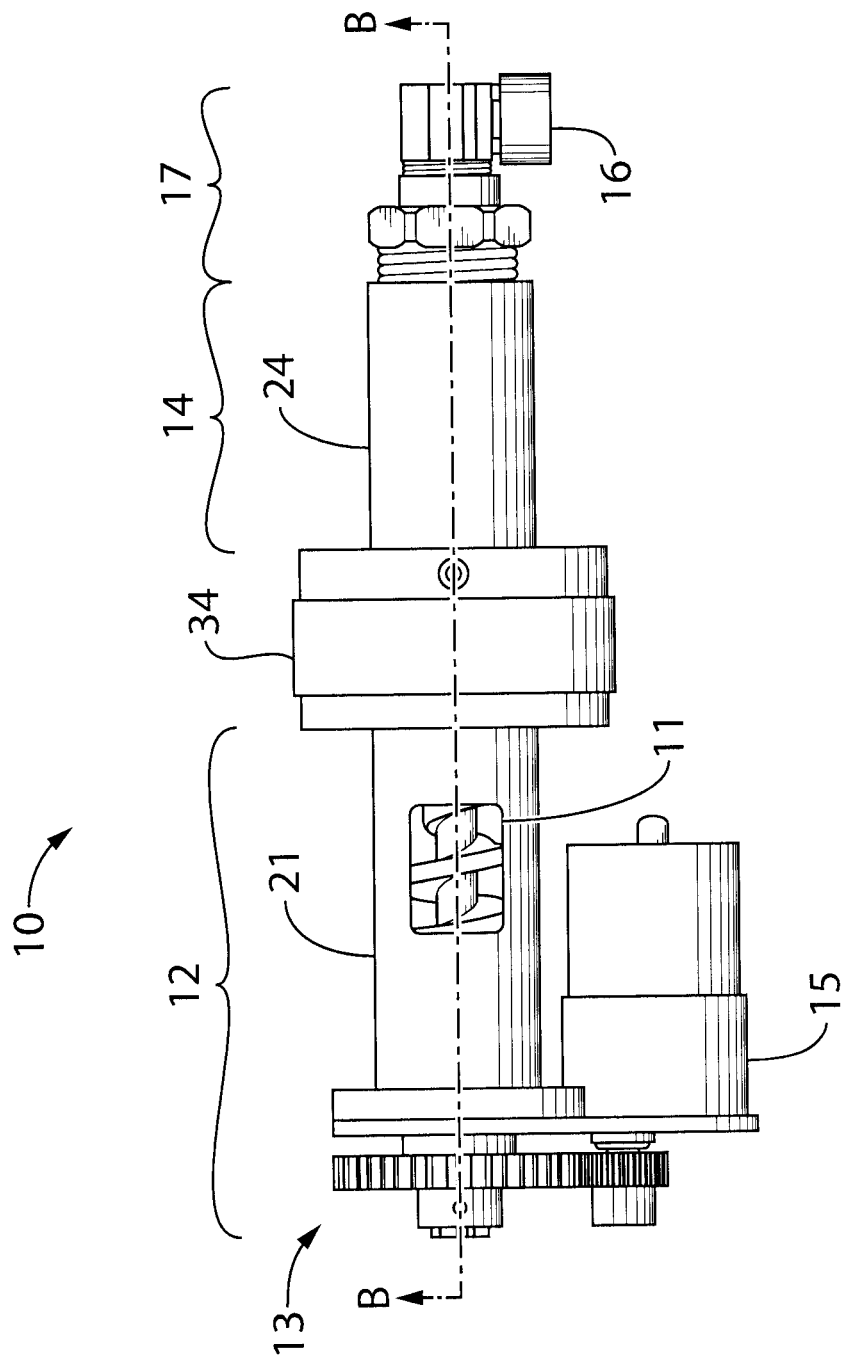
FIG. 6a is a top view of another exemplary apparatus for extruding suitable plastic material.
Figure 6B:
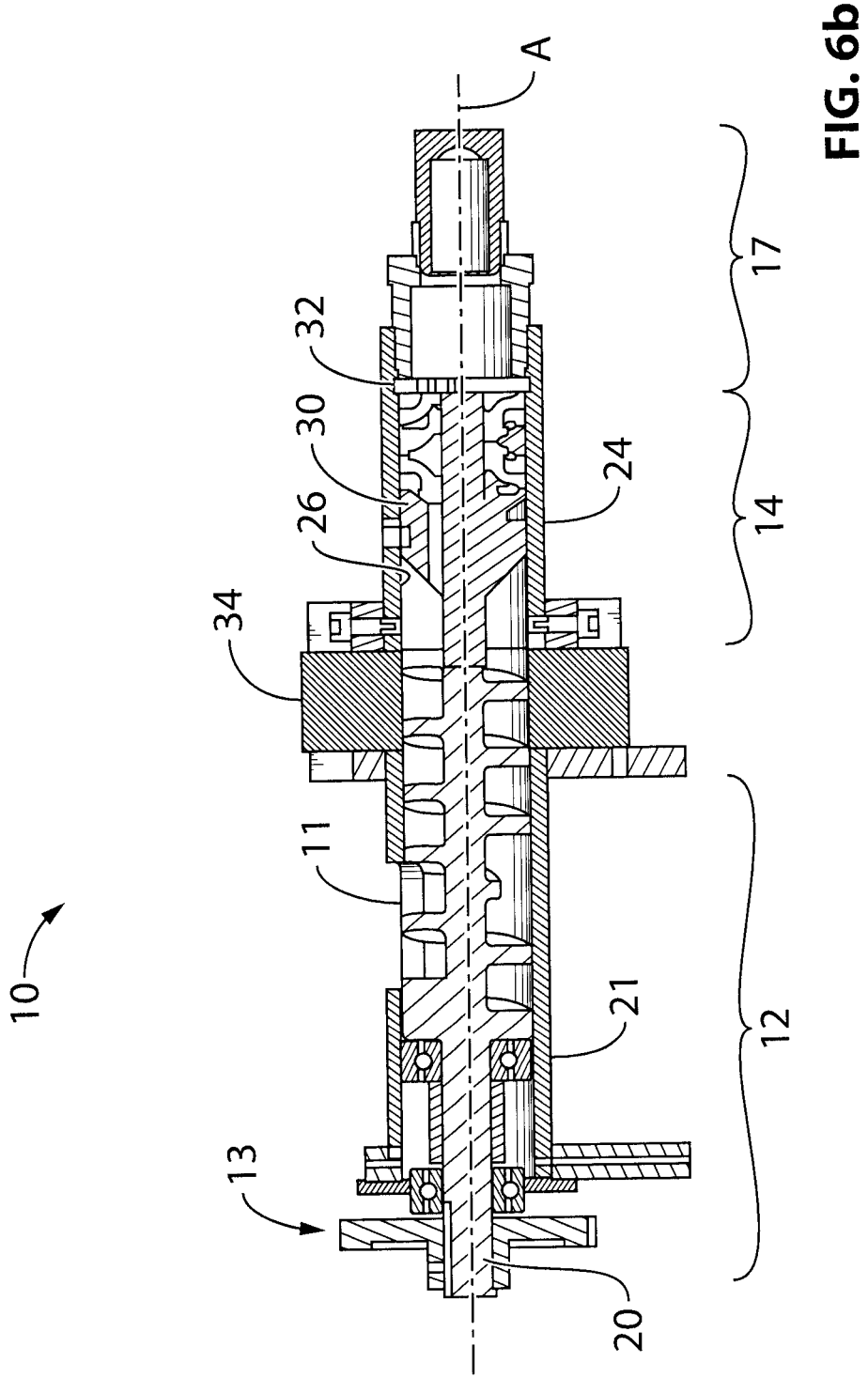

FIG. 6a is a top view of another exemplary apparatus 10 for extruding suitable plastic material 36 with heater 22 not being shown. Apparatus 10 of FIG. 6A may comprise melting insert 30 as illustrated in FIGS. 4b-4d or some other configuration of melting insert 30. FIG. 6b is a cross-sectional view of the apparatus 10 of FIG. 6a, taken along line B-B in FIG. 6a. As illustrated, the apparatus 10 may comprise feed opening 11, through which plastic material 36 may be deposited into feeding barrel 21. The apparatus 10 may include a drive motor 15 coupled to propeller 20 via one or more gears 13. Gears 13 and drive motor 15 may be utilized to actuate and turn the propeller 20, which in turn force and compress raw plastic material 36 down the feeding barrel 21. In one aspect, apparatus 10 of FIG. 6a may comprise a nozzle assembly 17 including screen 32 and output die 16. The nozzle assembly 17 may be in communication with melting portion 14 to facilitate extrusion of melted material. In some embodiments, output die 16 may extrude or produce the melted material in a direction substantially perpendicular to the longitudinal axis A of melting portion 14.

Figure 6C:
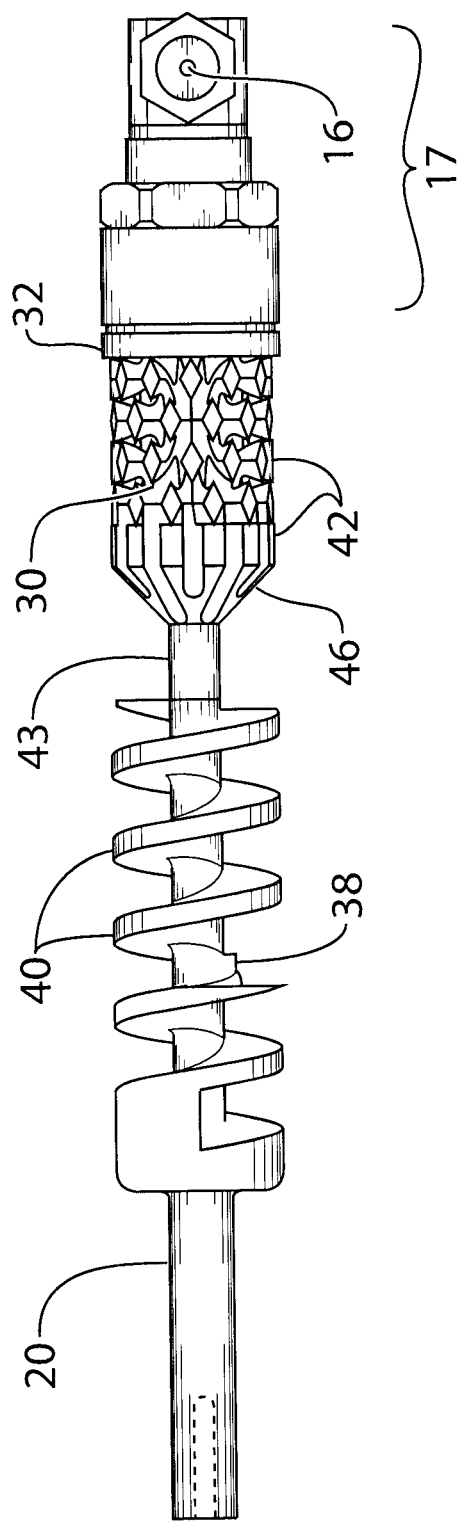

FIG. 6c is a side view of some components of the apparatus in FIG. 6a. A central rod 43 of melting insert 30 may extend to an end of propeller 20 to facilitate movement of plastic materials 36 into channels 44. In various embodiments, such central rod 43 may be integrally formed with or separate from melting insert 30 and disposed at or near leading end 46 of melting insert 30. Referring back to FIG. 6b, an annular channel may be formed between inner surface 26 of melting barrel 24 and peripheral surface of central rod 43, the annular channel may be substantially inside the melting chamber 28. The plastic material 36 may flow into the annual channel before reaching channels 44 of the melting insert 30. Such annular channel may promote heating and melting of plastic material 36 by having plastic material 36 flow closer to inner surface 26 of melting barrel 24.

During operation, a user may manually start the operation of extrusion apparatus 10, or the apparatus 10 may be started automatically based on a timer or software running in a suitable controller (not shown). Once started, the controller of apparatus 10 may monitor the temperature(s) on various parts of the apparatus 10. Once the proper temperature for melting the plastic material 36 has been reached in melting portion 14, the controller may (e.g., after a suitable delay) cause propeller 20 to start pushing material 36 toward melting portion 14. Material 36 may be received in propeller 20 via hopper 18, pushed into melting chamber 28 via propeller 20, melted inside melting chamber 28 with the assistance of melting insert 30 and delivered to output die 16 via channels 44 of melting insert 30.

Feeding portion 12 may receive material 36 from hopper 18 and propeller 20 may push or propel material 36 forward into melting portion 14. While within feeding portion 12, material 36 may substantially stay in its solid form as feeding portion 12 may not be significantly heated and may also be thermally insulated from melting portion 14 of apparatus 10. Accordingly, feeding barrel 21 and propeller 20 may remain relatively cool in comparison with melting portion 14 since propeller 20 may not extend into melting portion 14 and may not interact with significant amounts of melted material. Melting portion 14 may be maintained at the required temperature for melting material 36 while being insulated via thermal insulator 34 from the feeding portion 12 so that conductive heat loss may be reduced and the main loss of heat may be via the extrudate exiting output die 16.

Once inside melting chamber 28, material 36 may be heated by heater 22 via melting barrel 24, while being pushed further by incoming material 36 from feeding portion 12 and forced into channels 44 of melting insert 30. At this point, semi-viscous (and/or still somewhat solid) material 36 is divided into separate and parallel smaller flows via channels 44 of melting insert 30. Inside each channel 44, material 36 may be heated so that material 36 may be melted and turn into a viscous liquid due at least in part to the heating and friction provided by melting insert 30. Smaller channels 44 may have a higher surface area/volume, resulting in more viscous drag on the flow of material 36 from the enclosing surface area. Viscous friction associated with the flow of material 36 through channels 44 may generate heat and vary the flow velocity profile thereby promoting mixing and helping to produce uniform melting of material 36.

Channels 44 of melting insert 30 may be configured to provide adequate L/D ratio (e.g., equal to or greater than about 20) for frictional heating and mixing required for uniform melting of material 36 without requiring a large overall length due to the parallel arrangement of channels 44. Rather than having the melting of material 36 under interaction with the propeller 20 via compression, mixing, and heat generation, propeller 20 may only serve to propel or push material 36 in the feeding portion 12 toward the melting portion 14 without having propeller 20 physically extending into melting portion 14. This may allow for an overall size of apparatus 10 to be kept relatively small while still permitting practical and effective small scale extrusion operations.

After exiting channels 44, the melted material 36 may then be recombined or mixed into a single flow just before exiting output die 16 in the form of an extrudate. Additional particle material 36 may be added by the user as needed via hopper 18 during operation of the apparatus 10.

Figure 7:
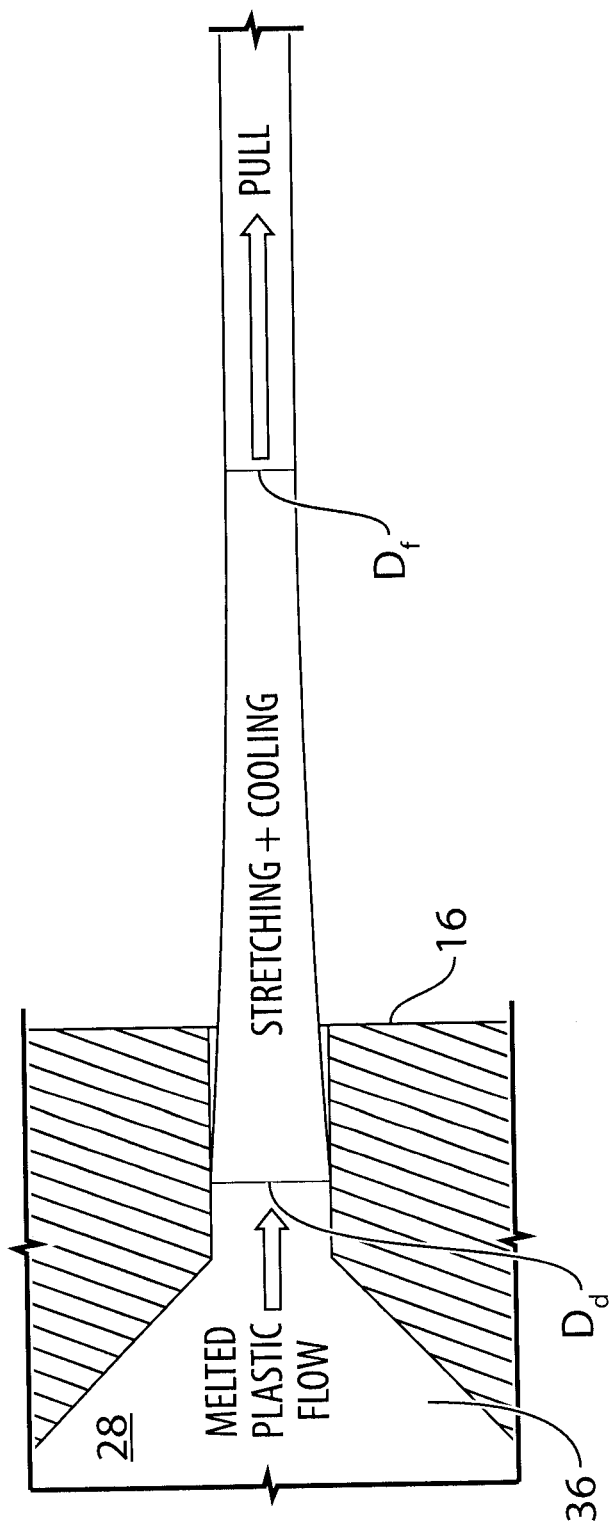
FIG. 7 illustrates a process of pulling on an extrudate being output by the apparatus of FIG. 1.

FIG. 7 illustrates a process of pulling on an extrudate being output via output die 16 of apparatus 10. As the extrudate exits output die 16, the extrudate may be subjected to a stretching and cooling process via puller 35 or other suitable mechanisms for pulling the plastic extrudate. Existing extrusion systems typically output mostly solid extrudate, while the pulling disclosed herein may be used to control the dimensional accuracy of the extrudate by pulling the extrudate while the extrudate is still in the form of a viscous liquid. Also, existing systems typically maintain tension, to track whatever the extruder is pushing out so it doesn't curve, bulge or stretch. In contrast, puller 35 may only need to maintain a constant drawing speed to relieve the constant built up pressure and stretch material 36 while it cools to its final size. The constant speed of puller 35 may be delivered by stepper motor or other suitable means of applying the drawing force on the extrudate. Changes to extrudate diameter may then be achieved by changing the speed of puller 35 via suitable control software rather than having to adjust die size, and possibly the tensioning system as is done in existing systems.

Puller 35 may continuously draw melted material 36 from output die 16 through a cooling stage. The size of output die 16 may be larger than the desired final diameter of the extrudate and material 36 may be continuously pulled through a cooling medium to elongate while cooling. The cooling medium may be air, water, or any other suitable fluid, and can be still or in motion to obtain free or forced convection. Puller 35 may comprise a pair of relatively soft, high friction rollers configured to grab the extrudate and draw it out at a constant rate. A suitable mechanism may control the compressive force between the rollers to maintain a suitable gripping force without deforming, squishing or otherwise damaging the extrudate. The drawing speed of puller 35 may affect polymer elongation, which may consequently affect tensile properties and the resulting diameter of extrudate. Assuming constant material properties and throughput rate at output die 16, a constant draw rate may provide constant extrudate diameter and physical and mechanical properties. Material 36 may emerge from output die 16 as a viscous liquid (e.g., above the polymer's flow point) at a larger, pre-form diameter. Material 36 may then be pulled straight out from die 16 and stretched to the correct diameter as it cools.

The forced elongation during cooling may overrule inconsistencies caused by nozzle drag and environmental surroundings. Constant stretching of material 36 as it exits output die 16 may also reduce or eliminate the effect of die swell. For a given volume flow rate at output die 16, the drawing speed may control elongation and diameter of the resulting extrudate. For example, for a given throughput, a faster pull may result in a thinner and more elongated extrudate thereby allowing for a range of extrudate diameters to be obtained from the same output die 16.

Elongation of polymers can also stretch and align the molecular chains, resulting in a more flexible, less brittle extrudate. Accordingly, pull speed and the diameter of output die 16 may be changed to change the amount of elongation obtained and achieve the same extrudate diameter ranges. Also, changing the size of output die 16 while keeping the other parameters constant may result in getting same elongation at different diameters. The use of this method of cooling while stretching to size may require a relatively consistent melting of material in melting portion 14 and the use of melting insert 30 may help in this regard.

In various embodiments, one or more controllers and/or sensors (not illustrated) coupled to various parts of the apparatus 10 in order to measure and control the temperature(s) at the various parts of the apparatus 10 and also control various aspects of operation of apparatus. For example, such controller may be configured to control the starting and stopping of propeller 20 and optionally also the input torque to propeller 20. For example, such controller may be configured to control the starting and stopping of puller 35 and optionally also the draw speed of puller 35. It is understood that operation parameters associated with apparatus 10 may vary depending on factors such as the type of material 36 used, heat input, desired throughput and specific configuration of apparatus 10.

In various embodiments, improved melting consistency may permit the implementation of a standardized system where basic parameters may be changed (e.g., input) to adjust properties for different plastics or diameters of extrudate. This may also improve stability of apparatus 10 and reduce the amount of human interaction required to adjust the settings.

In yet further embodiments, melting insert 30 and melting barrel 24 may be integrally formed in a one-piece structure. Alternatively or concurrently, a direct thermal conduction path may be defined between melting barrel 24 and melting insert 30.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. Also, one skilled in the relevant arts will appreciate that while the systems, devices and assemblies disclosed and shown herein may comprise a specific number of elements/components, the systems, devices and assemblies could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed is:

1. An apparatus for extruding plastic material, the apparatus comprising:
    a feeding portion;
    a melting portion in communication with the feeding portion and configured to transmit heat into the material received from the feeding portion; and
    an output die in communication with the melting portion to permit extrusion of the material received from the melting portion;
    the melting portion comprising:
        a melting barrel having an inner surface defining a melting chamber in communication with the feeding portion; and
        a melting insert inside the melting chamber, the melting insert comprising an outer surface at least partially in contact with the inner surface of the melting barrel, the outer surface of the melting insert comprising one or more open-ended channels formed therein and extending in a flow direction of the melting barrel, the one or more channels and the inner surface of the melting barrel defining corresponding one or more through flow passages for delivering the material toward the output die,
    wherein:
        two or more of the channels intersect each other;
        the melting insert has a solid core and a tapered leading end;
        the feeding portion comprises an auger disposed entirely outside of the melting portion;
        a thermal insulator is disposed between the feeding portion and the melting portion;
        the one or more channels comprise a plurality of channels circumferentially distributed about the melting insert and separated by intermediate outer surface portions; and
        the intermediate outer surface portions and the inner surface of the melting barrel define a direct thermal conduction path between the melting barrel and the melting insert.

2. The apparatus as defined in claim 1, wherein the melting insert has a tapered trailing end.

3. The apparatus as defined in claim 1, wherein the one or more channels extend along respective directions that are non-parallel to the flow direction of the melting barrel.

4. The apparatus as defined in claim 1, wherein
    the melting portion includes a rod extending between the melting insert and the auger, the rod and the melting barrel defining an annular passage between the auger and the melting insert.

* * * * *